(12) United States Patent
Ramaswamy et al.

(10) Patent No.: US 9,172,997 B2
(45) Date of Patent: *Oct. 27, 2015

(54) METHODS AND APPARATUS TO COLLECT MEDIA EXPOSURE INFORMATION

(71) Applicant: The Nielsen Company (US), LLC, Schaumburg, IL (US)

(72) Inventors: Arun Ramaswamy, Tampa, FL (US); Bruce Hoynoski, Lake Barrington, IL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/157,484

(22) Filed: Jan. 16, 2014

(65) Prior Publication Data

US 2014/0137143 A1 May 15, 2014

Related U.S. Application Data

(63) Continuation of application No. 13/663,373, filed on Oct. 29, 2012, now Pat. No. 8,666,303, which is a continuation of application No. 12/164,967, filed on Jun. 30, 2008, now Pat. No. 8,326,212.

(60) Provisional application No. 60/986,190, filed on Nov. 7, 2007.

(51) Int. Cl.
*H04H 60/29* (2008.01)
*H04N 21/442* (2011.01)
(Continued)

(52) U.S. Cl.
CPC ..... *H04N 21/44222* (2013.01); *G06Q 30/0201* (2013.01); *H04H 60/31* (2013.01); *H04N 21/44218* (2013.01); *H04H 60/39* (2013.01); *H04H 60/66* (2013.01)

(58) Field of Classification Search
CPC ... G06Q 30/0201; H04H 60/31; H04H 60/33; H04H 60/35; H04H 60/58; H04H 60/59; H04H 60/61; H04H 60/64; H04H 60/65; H04H 60/66; H04H 60/41; H04H 60/42; H04H 60/43; H04H 60/44; H04H 60/49
USPC ......... 455/20.1, 3.06, 414.1, 154.2, 415, 420, 455/425, 435.1, 41.2, 552.1, 115.1, 556.1; 725/11, 13, 19, 9, 14; 705/10, 14; 235/375, 492; 340/539.1, 686.6
See application file for complete search history.

(56) References Cited

U.S. PATENT DOCUMENTS 4,329,684 A 5/1982 Monteath et al.
4,613,904 A 9/1986 Lurie
(Continued)

OTHER PUBLICATIONS

United States Patent and Trademark Office, "Notice of Allowance," issued in connection with U.S. Appl. No. 12/164,967, Jul. 27, 2012, 8 pages.
(Continued)

*Primary Examiner* — Tan Trinh
(74) *Attorney, Agent, or Firm* — Hanley, Flight & Zimmerman, LLC

(57) ABSTRACT

Methods and apparatus to collect media exposure information are described. An example metering device to collect media exposure information includes a housing; an input carried by the housing; a display carried by the housing to present a list of media stations which may be tuned by a media device different than the metering device, the metering device incapable of tuning to the media stations; a processor carried by the housing to identify which of the media stations is displayed when the input is selected; and memory carried by the housing to store an indication of an exposure to the identified media station via the media device, the indication including the identified media station and a timestamp corresponding the selection of the input.

21 Claims, 8 Drawing Sheets

(51) Int. Cl.
*G06Q 30/02* (2012.01)
*H04H 60/31* (2008.01)
*H04H 60/39* (2008.01)
*H04H 60/66* (2008.01)

(56) References Cited

U.S. PATENT DOCUMENTS

| | | | |
|---|---|---|---|
| 4,816,904 | A | 3/1989 | McKenna et al. |
| 4,905,080 | A | 2/1990 | Watanabe et al. |
| 5,023,929 | A | 6/1991 | Call |
| 5,249,044 | A | 9/1993 | Von Kohorn |
| 5,253,066 | A | 10/1993 | Vogel |
| 5,664,110 | A | 9/1997 | Green et al. |
| 5,826,164 | A | 10/1998 | Weinblatt |
| 6,286,140 | B1 | 9/2001 | Ivanyi |
| 6,685,093 | B2 | 2/2004 | Challa et al. |
| 6,736,322 | B2 | 5/2004 | Gobburu et al. |
| 7,028,906 | B2 | 4/2006 | Challa et al. |
| 8,166,497 | B2 | 4/2012 | Mears |
| 8,326,212 | B2 | 12/2012 | Ramaswamy et al. |
| 8,458,749 | B2* | 6/2013 | Howcroft et al. ............... 725/61 |
| 8,666,303 | B2 | 3/2014 | Ramaswamy et al. |
| 2002/0196275 | A1 | 12/2002 | Willner et al. |
| 2003/0079219 | A1 | 4/2003 | Lammerhuber |
| 2003/0126593 | A1 | 7/2003 | Mault |
| 2003/0158796 | A1* | 8/2003 | Balent ............................ 705/28 |
| 2003/0172375 | A1 | 9/2003 | Shaw et al. |
| 2004/0031045 | A1 | 2/2004 | Ivanyi |
| 2005/0055242 | A1* | 3/2005 | Bello et al. ....................... 705/2 |
| 2006/0118618 | A1 | 6/2006 | Schultz et al. |
| 2006/0155619 | A1 | 7/2006 | Rhiando et al. |
| 2006/0156343 | A1* | 7/2006 | Jordan ........................... 725/50 |
| 2007/0198433 | A1 | 8/2007 | McGee et al. |
| 2007/0266395 | A1 | 11/2007 | Lee et al. |
| 2007/0294126 | A1* | 12/2007 | Maggio ........................... 705/10 |
| 2008/0059293 | A1* | 3/2008 | Hengel ........................... 705/14 |
| 2008/0059988 | A1 | 3/2008 | Lee et al. |
| 2008/0103626 | A1* | 5/2008 | Frankel |
| 2008/0126420 | A1 | 5/2008 | Wright et al. |
| 2008/0135629 | A1 | 6/2008 | Douglas |
| 2008/0140479 | A1 | 6/2008 | Mello et al. |
| 2008/0170755 | A1 | 7/2008 | Nasser et al. |
| 2008/0172261 | A1 | 7/2008 | Albertson et al. |
| 2008/0263579 | A1 | 10/2008 | Mears et al. |
| 2009/0007169 | A1 | 1/2009 | Headley et al. |
| 2009/0055854 | A1 | 2/2009 | Wright et al. |
| 2009/0070797 | A1 | 3/2009 | Ramaswamy et al. |
| 2009/0089823 | A1 | 4/2009 | Mears |
| 2009/0106397 | A1 | 4/2009 | O'Keefe |
| 2009/0150217 | A1* | 6/2009 | Luff ................................ 705/10 |
| 2009/0215416 | A1* | 8/2009 | Devore ....................... 455/185.1 |
| 2010/0077420 | A1* | 3/2010 | Nielsen et al. ..................... 725/9 |
| 2010/0083290 | A1* | 4/2010 | Kang et al. ..................... 720/600 |
| 2010/0102981 | A1* | 4/2010 | Nielsen et al. ............. 340/686.6 |
| 2010/0199296 | A1 | 8/2010 | Lee et al. |
| 2010/0206949 | A1* | 8/2010 | Mattlin et al. ................. 235/375 |
| 2010/0257052 | A1 | 10/2010 | Zito et al. |
| 2010/0285763 | A1* | 11/2010 | Ingrassia et al. ........... 455/185.1 |
| 2011/0225064 | A1 | 9/2011 | Fou |
| 2012/0196626 | A1 | 8/2012 | Fano et al. |

OTHER PUBLICATIONS

United States Patent and Trademark Office, "Office Action," issued in connection with U.S. Appl. No. 12/164,967, Dec. 5, 2011, 16 pages.
United States Patent and Trademark Office, "Office Action," issued in connection with U.S. Appl. No. 12/164,967, Jul. 5, 2011, 10 pages.
United States Patent and Trademark Office, "Office Action," issued in connection with U.S. Appl. No. 13/663,373, Mar. 18, 2013, 25 pages.
United States Patent and Trademark Office, "Office Action," issued in connection with U.S. Appl. No. 13/663,373, Aug. 8, 2013, 12 pages.
United States Patent and Trademark Office, "Notice of Allowance," issued in connection with U.S. Appl. No. 13/663,373, Oct. 16, 2013, 19 pages.

* cited by examiner

METHODS AND APPARATUS TO COLLECT MEDIA EXPOSURE INFORMATION

RELATED APPLICATIONS

This patent arises from a continuation of U.S. patent application Ser. No. 13/663,373, filed Oct. 29, 2012, now U.S. Pat. No. 8,666,303, which is a continuation of U.S. patent application Ser. No. 12/164,967, filed Jun. 30, 2008, now U.S. Pat. No. 8,326,212, which claims priority from U.S. Provisional Patent Application Ser. No. 60/986,190, filed on Nov. 7, 2007. U.S. patent application Ser. No. 13/663,373, U.S. patent application Ser. No. 12/164,967 and U.S. Provisional Patent Application Ser. No. 60/986,190 are hereby incorporated herein by reference in their entireties.

FIELD OF THE DISCLOSURE

The present disclosure relates generally to monitoring audience member activities and, more particularly, to methods and apparatus to collect media exposure information.

BACKGROUND

Media-centric companies are often interested in tracking how often and/or how long audience members are exposed to media compositions (e.g., television programs, motion pictures, internet videos, radio programs, etc.). To obtain exposure information, some techniques include generating signatures (e.g., representations of some, preferably unique, portion of the media composition or the signal used to transport the media composition) or embedding identification codes (e.g., watermarks) that are then detected at a time of exposure (e.g., during a television viewing session).

Other techniques include active audience member participation. In one example exposure detection system, audience members (e.g., members of a household) are given surveys to be completed at the end of a week to indicate which television and/or radio stations to which they were exposed during the week.

DETAILED DESCRIPTION

Figure 1:
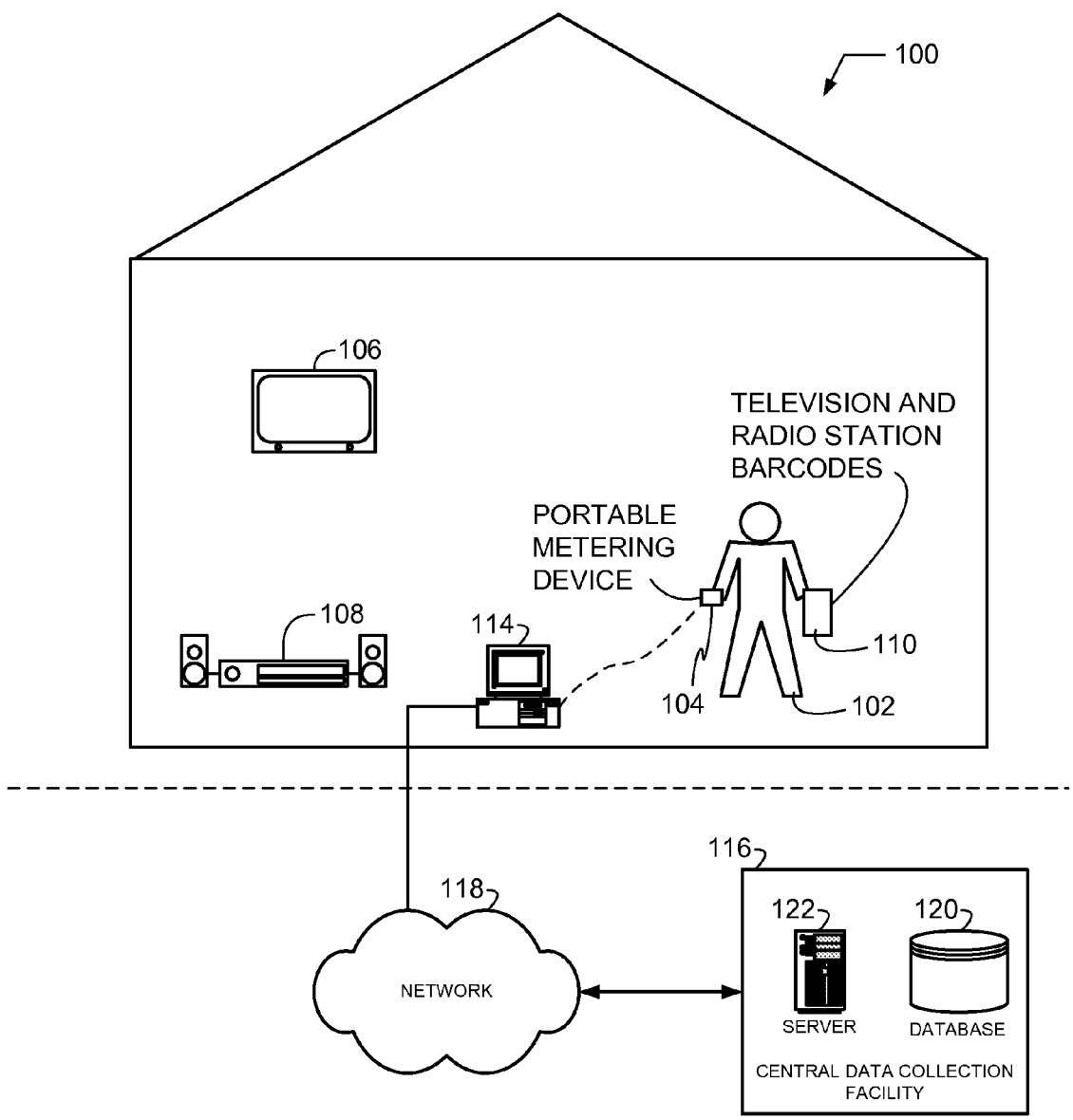
FIG. 1 illustrates an example media consumption environment in which an audience member carries an example portable metering device to collect media exposure information.

Although the following discloses example methods, apparatus, systems, and articles of manufacture including, among other components, firmware and/or software executed on hardware, it should be noted that such methods, apparatus, and systems are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

The example methods and apparatus described herein are used to collect media exposure information indicative of a session during which one or more audience members are exposed to media (e.g., television programming, radio processing, internet programming, etc.). In particular, the example methods and apparatus described herein are implemented using portable metering device(s) and/or stationary metering device(s) that audience member(s) use to specify, for example, media station(s) (e.g., television station(s) and/or radio station(s)) to which media presentation device(s) (e.g., televisions, personal computers, and/or radios) in proximity of the audience member(s) are tuned. Any type of media presentation device(s) may be used to receive media via any type of distribution medium such as, for example, cable, satellite systems, Internet, and/or over-the-air distribution mediums. In some example implementations, such as when a metering device is portable and to be carried by an individual, the metering device is assigned to an audience member participating in a market research study. In such instances, the metering device stores a unique audience member identifier corresponding to its respective audience member (e.g., by personal name, by family name, by family position (e.g., father, mother, brother, etc.), by a proxy assigned to members of a household, etc.). In other example implementations, such as when a metering device is stationary and to be placed proximate a media presentation device of a household, the metering device is configured to receive an input including a unique audience member identifier corresponding to a member of the household.

In some example implementations, a metering device includes a barcode scanner, a time-keeping device, and a memory. In such instances, each audience member is provided with a plurality of barcodes identifying a plurality of media stations (e.g., television and/or radio stations) that the audience member can be or is likely to be exposed to in a certain geographic area (e.g., an area surrounding a residence of the audience member or a destination to which the audience member is likely or expected to travel). The barcodes are printed on a portable card and/or a card fixed proximate a media presentation device. When the audience member tunes a media presentation device (e.g., a television, a personal computer, or a radio) to a particular media station or is otherwise exposed to a particular media station, the audience member is to use the example metering device to scan a barcode identifying the media station to which the audience member is exposed. The example metering device stores a station identifier (e.g., electronically in the memory as a string of data) corresponding to the scanned barcode in association with a timestamp indicative of when the station identifying barcode was scanned. In this manner, the example metering device stores a listing of station identifier(s) and corresponding timestamp(s) to track media station(s) to which the audience member was exposed, the date(s) and times of day on which the exposure(s) occurred, the duration(s) during which the exposure(s) occurred, and/or any other media exposure information. The media exposure information is then conveyed (e.g., uploaded via a data network and/or mailed) to a central collection facility (e.g., a server and/or database located remotely from the metering device), at which point the media exposure information is analyzed by, for example, a media exposure measurement entity.

Additionally or alternatively, the example methods and apparatus described herein can be implemented using a metering device that is configured to store and display media station identifiers corresponding to one or more media stations that an audience member can be exposed to or is likely to be exposed to in a certain geographic area (e.g., an area surrounding a residence of the audience member or a destination to which the audience member is likely or expected to travel). In such example implementations, the metering device may store and display the media station identifiers in addition to or without implementing a barcode scanner as described above. Instead of or in addition to scanning printed media station identifying barcodes, when the audience member is exposed to programming from a media station, the audience member can specify or select a corresponding one of the media station identifiers stored (e.g., by a market research entity) and displayed on the metering device. In turn, the metering device can store the specified or selected one of the station identifiers in association with a timestamp indicative of the date and time when the audience member selected the station identifier.

In some example implementations, the metering device is portable and is to be carried by, for example, attachment to a key ring. Additionally or alternatively, a household participating in a market research study using the example methods and apparatus described herein can be provided with one or more stationary metering devices. In such examples, the stationary metering device(s) are placed next to one or more media presentation device(s) (e.g., a television, a radio, a personal computer, etc.). In some examples, an arrangement (e.g., a printed card) of media station identifying barcodes are also placed proximate the media presentation device(s). When an audience member tunes a media presentation device to a particular media station, the audience member scans one of the station identifying barcodes using a barcode scanner implemented in the stationary metering device. In some examples, the audience member additionally scans an audience member identifier barcode that identifies the audience member to which the media station programming is exposed. In turn, the stationary metering device can store the station identifier corresponding to the scanned barcode and the audience member identifier in association with a timestamp indicative of the date and time at which the barcode and the audience member identifier were scanned. In some examples, the stationary metering devices additionally or alternatively store and display a plurality of media station identifiers to be selected in response to an exposure to a media station.

FIG. 1 illustrates an example media consumption environment 100 (e.g., a household 100) in which an audience member 102 carries a portable metering device 104 to collect media exposure information. The example media consumption environment 100 includes a television 106 and a radio or stereo 108 and may include other media presentation devices (e.g., a set-top box (STB), a personal computer capable of tuning to a television and/or ratio station, etc.). In the illustrated example, the audience member 102 carries a media station identifier card 110 having media station identifying barcodes printed thereon. Additionally or alternatively, media station identifier cards could be placed near the monitored information presentation devices (e.g., the television 106 and/or the radio 108), in which case the audience member 102 may choose not to carry the media station identifier card 110. In the illustrated example, the media station identifier card 110 is prepared by a market research entity by selecting, for example, the television and/or radio stations (e.g., the most popular stations, all stations, and/or television and/or radio stations of interest for market research) for the geographic area in which the audience member 102 is located (e.g., where the audience member 102 resides) or in which the media consumption environment 100 is located. An example implementation of the media station identifier card 110 is shown in detail in FIG. 3.

To collect media exposure information, the audience member 102 uses a barcode scanner (e.g., the barcode reader 1129 of FIG. 11) of the portable metering device 104 to scan one of the station identifying barcodes of the media station identifier card 110 when the television 106 and/or the radio 108 is tuned to that media station. The portable metering device 104 then generates a timestamp via the timing device indicative of the time at which the audience member 102 scanned the barcode. The portable metering device then stores the station identifier corresponding to the scanned barcode in association with the generated timestamp. When station tuned by the television 106 or the radio 108 is changed to a different station, the audience member 102 scans the station identifying barcodes representative of the newly tuned station. In response, another timestamp is generated to indicate two events. Specifically, the newly generated timestamp indicates the time at which exposure to the previously tuned station ceased and the time at which exposure to the newly tuned station began. Thus, in the illustrated example, the newly generated timestamp is stored in association with the station identifier representative of the previously tuned station to indicate an end of a media exposure session. Further, the newly generated timestamp is also stored in association with the station identifier representative of the newly tuned station to indicate a start of a new media exposure session. When the television 106 or the radio 108 is powered off or the audience member 102 is no longer exposed to a media presentation (e.g., the audience member 102 walks away from the television 106 or the radio 108 or leaves the media consumption environment 100), the audience member 102 scans an 'END' barcode (e.g., the 'END' barcode 302 of FIG. 3) on the station identifier card 110 to indicate a time at which exposure to the television 106 and/or the radio 108 ended.

In the illustrated example, the portable metering device 104 is battery powered so that the audience member 102 can carry the device outside of, for example, a residence. In this manner, the portable metering device 104 can be used to collect media exposure information anywhere within or outside of the example media consumption environment 100 shown in FIG. 1. For example, the audience member 102 can use the portable metering device 104 while in an automobile to specify, for example, radio stations and/or television stations to which a media presentation device in the automobile is tuned. The audience member 102 can also use the portable metering device 104 while at work or at any other place.

In the illustrated example, the media consumption environment 100 is provided with a computer 114 (e.g., a laptop computer, a personal computer, or processing machine dedicated to the portable metering device 104) communicatively coupled to a central data collection facility 116. In the illustrated example, to transfer the media exposure information stored in the memory of the portable metering device 104, the portable metering device 104 is configured to be communicatively coupled to the computer 114. Additionally, the portable metering device 104 may be configured to be communicatively coupled to other processing devices, such as handheld devices (e.g., personal digital assistants, cellular telephones, etc.), or any other device capable of communicating with the central data collection facility 116. The portable metering device 104 uploads its stored media exposure information and an audience member personal identifier indicative of the audience member 102 to the computer 114 (or other device), and the computer 114 (or other device) communicates the media exposure information and the personal identifier to the central facility 116 via a network 118 (e.g., a broadband network connection, a dial-up network connection, etc.). In some example implementations, the audience member 102 may additionally or alternatively ship (e.g., via the United States Postal Service, in an envelope provided by the entity that provided the portable metering device 104) the portable metering device 104 to the central data collection facility 116 so that the media exposure data can be retrieved from the portable metering device 104. At the central facility 116, the media exposure information is stored in a database 120 and/or processed by a server 122 to analyze the times, durations, and/or amounts of exposure to different media stations.

In some example implementations, instead of or in addition to employing the barcode scanner and the card 110 described above, the portable metering device 104 is configured to store a list of media station identifiers indicative of media stations to which the audience member 102 can be or is likely to be exposed (e.g., according to the geographic location in which the audience member 102 resides or is otherwise located). In such example implementations, the portable metering device 104 is configured to display the stored media station identifiers so that, when the audience member 102 is exposed to a particular media station, the audience member 102 can select the tuned station via a display associated with the metering device 104 and a user input interface, an example of which is described below in connection with FIG. 7. In response to such an input, the portable metering device 104 generates a timestamp and stores the selected station identifier in association with the timestamp. Thus, in such examples, the audience member 102 has the option to forego carrying the station identifier card 110.

Figure 2:
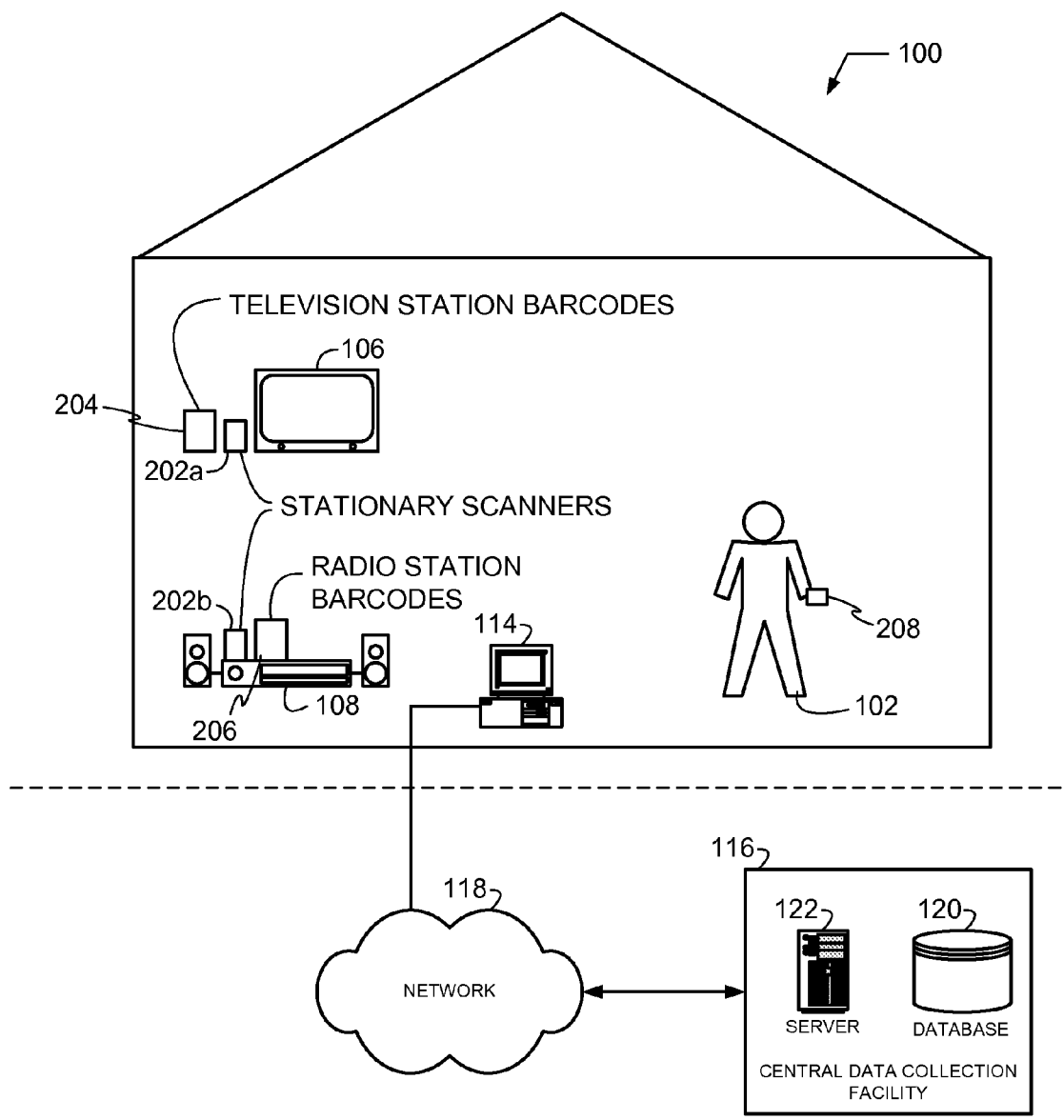
FIG. 2 illustrates the example media consumption environment of FIG. 1 in which example stationary metering devices are located proximate example media presentation devices in the media consumption environment to collect media exposure information.

FIG. 2 illustrates the example media consumption environment 100 of FIG. 1 but provided with other example metering devices. Specifically, FIG. 2 shows stationary metering devices 202a and 202b proximate the television 106 and the radio 108 of the media consumption environment 100. In the illustrated example of FIG. 2, television station identifying barcodes 204 are placed proximate the television 106 and radio station identifying barcodes 206 are placed proximate the radio 108. Example television station identifying barcodes 204 are shown in detail in FIG. 4. Example radio station identifying barcodes 206 are shown in detail in FIG. 5. When the television 106 is tuned to a television station, the audience member 102 scans a corresponding one of the television station identifying barcodes 204 using a barcode scanner (e.g., the barcode reader 1129 of FIG. 11) of the stationary metering device 202a to indicate the television station to which the audience member 102 is exposed. Similarly, when the radio 108 is tuned to a radio station, the audience member 102 scans a corresponding one of the radio station identifying barcodes 206 using a barcode scanner of the stationary metering device 202b to indicate the radio station to which the audience member 102 is exposed. To identify the audience member 102 who is exposed to the television and/or radio station(s), the audience member 102 is provided with a personal identifier barcode card 208 that the audience member 102 can scan into the stationary metering devices 202a and/or 202b to indicate the identity of the audience member 102.

In some example implementations, instead of or in addition to providing the station identifying barcodes 204 and 206, the stationary metering devices 202a and/or 202b are configured to store and display a listing of media station identifiers indicative of stations to which the audience member 102 may be exposed or is likely to be exposed. In such instances, instead of scanning a station identifying barcode, the audience member 102 may select from one of the media station identifiers stored in one of the stationary metering devices 202a and/or 202b to indicate, for example, the television and/or radio station to which the audience member 102 is exposed.

In the illustrated example, to transfer media exposure information and audience member personal identifiers stored in the stationary metering devices 202a-b to the central data collection facility 116, the stationary metering devices 202a-b are communicatively coupled to the computer 114 via wired or wireless communication medium(s). The computer 114 periodically or aperiodically communicates the media exposure information and personal identifiers to the central facility 116. Additionally or alternatively, the stationary metering devices 202a-b can be shipped back to the central facility 116 so that the media exposure information can be retrieved from the devices 202a-b at the facility 116. In such an approach, the audience member is preferably provided with substitute devices before shipping the devices 202 back to the central facility 116.

Figure 3:
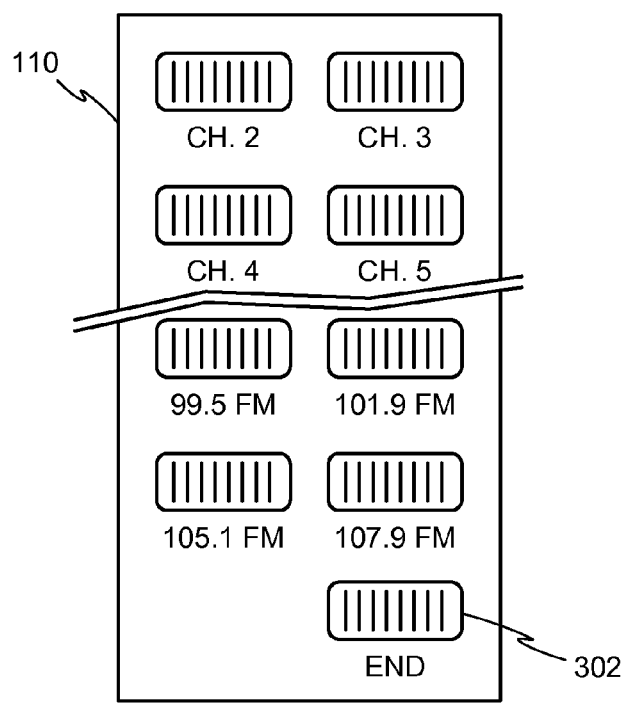
FIG. 3 illustrates an example barcode arrangement having a plurality of media station identifying barcodes.
Figure 4:
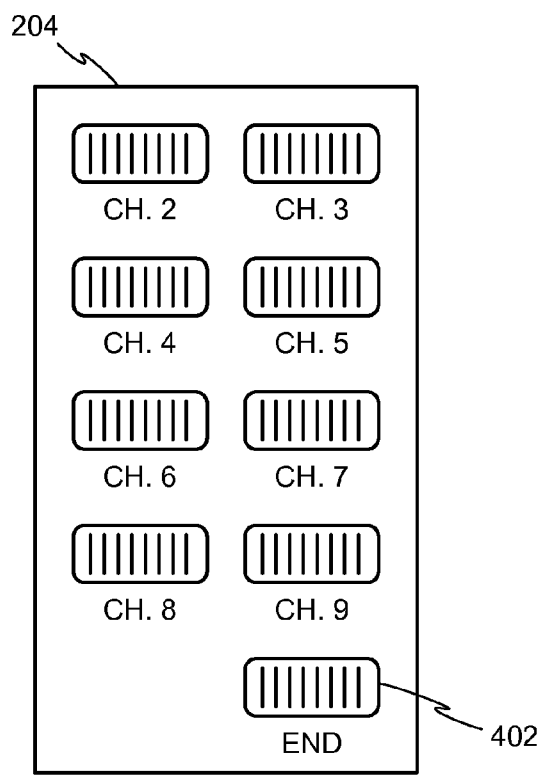
FIG. 4 illustrates an example barcode arrangement having a plurality of television station identifying barcodes.
Figure 5:
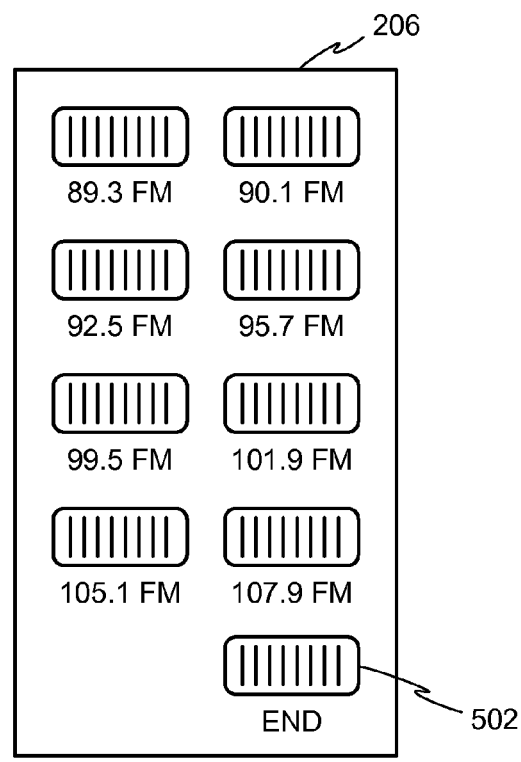
FIG. 5 illustrates an example barcode arrangement having a plurality of radio station identifying barcodes.

FIGS. 3-5 illustrate example implementations of the example portable media station identifier card 110 of FIG. 1 and the example stationary media station identifier cards 204 and 206 of FIG. 2. In FIG. 3, the example portable card 110 includes barcodes representative of television and radio stations. In FIG. 4, the example stationary card 204 is configured to be placed proximate the television 106 of FIG. 2 and, thus, includes barcodes representative of example television stations, but no radio station barcodes. In FIG. 5, the example stationary card 206 is configured to be placed proximate the radio 108 of FIG. 2 and, thus, includes barcodes representative of example radio stations, but no television station barcodes. Further, the example portable media station identifier card 110 of FIG. 3, the example stationary media station identifier card 204 of FIG. 4, and the example stationary media station identifier card 206 of FIG. 5 include 'END' barcodes 302, 402, and 502, respectively. As described herein, the 'END' barcodes 302, 402, and/or 502 are to be scanned at the end of a media exposure session.

In some example implementations, media station identifier cards may be combined, packetized, coupled together, or otherwise arranged. For example, one or more station identifier cards may be attachable to a key ring in a similar manner as the portable metering device 600 described below in connection with FIG. 6. Further, audience members may periodically received updated cards via mail, electronic mail, or any other suitable delivery method. The cards can also be customized for individual audience members and/or households based on, for example, user input, subscribed programming packages, and/or according to a design implemented by a media measurement entity (e.g., the entity that provides the barcode cards and/or metering devices described herein).

Figure 6:
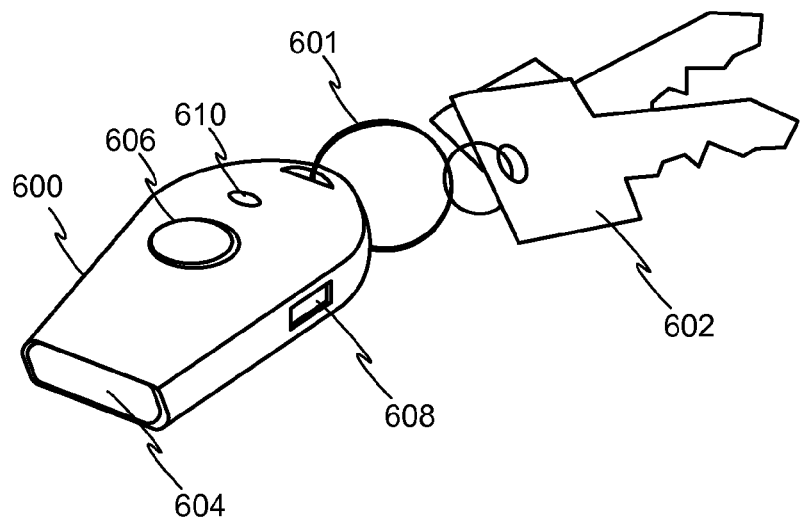
FIG. 6 illustrates an example portable metering device that may be used to implement the example portable metering device of FIG. 1.

FIG. 6 illustrates an example portable metering device 600 that may be used to implement the example portable metering device 104 of FIG. 1. In the illustrated example of FIG. 6, the example portable metering device 600 is implemented as a key fob that is attachable to a key ring 601 (e.g., with a set of keys 602) and is implemented to have a form factor that facilitates carrying the portable metering device 600 by the audience member 102 (FIG. 1). The example device 600 is provided with a barcode scanner 604 (e.g., the barcode reader 1129 of FIG. 11) to scan station identifying barcodes on, for example, the media station identifier card 110 of FIG. 1. To activate the barcode scanner 604, the device 600 is provided with a scan button 606 that the audience member 102 is to depress when the audience member 102 wishes to scan a barcode to indicate an exposure to a corresponding media station.

The example device 600 of FIG. 6 includes a memory to store media exposure information (e.g., media station identifiers and associated timestamps) and an audience member personal identifier. To transfer the media exposure information and the audience member personal identifier stored in the memory of the device 600 to the computer 114 of FIG. 1, the device 600 is provided with a data interface or port 608 (e.g., the communication device 1128 of FIG. 11), which may be implemented using any type of wired data interface (e.g. Universal Serial Bus (USB), RS-232, etc.). To initiate a data transfer process, the device 600 is provided with a data transfer button 610 to be depressed when the audience member 102 wishes to transfer media exposure information from the device 600 to the computer 114. Additionally or alternatively, the device 600 may be provided with a wireless data transfer interface (e.g., a Bluetooth® interface, a Zigbee® interface, an IEEE 802.11 interface, etc.) to interact with the computer 114 and/or directly with the central data collection facility 116.

Figure 7:
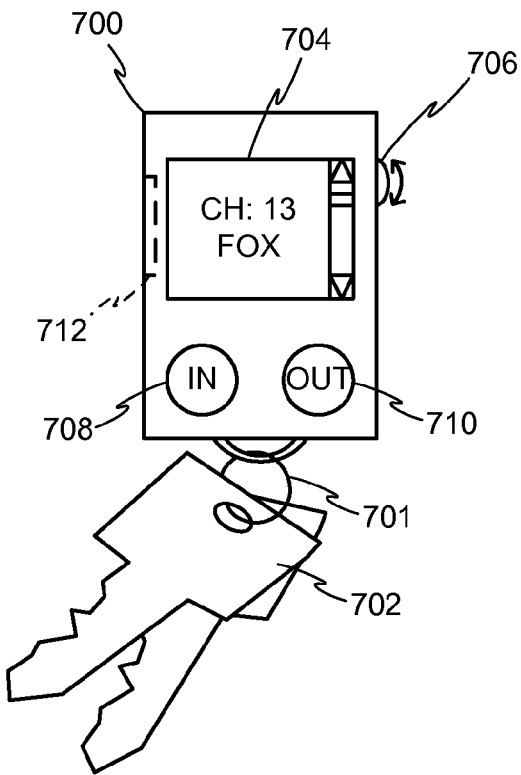
FIG. 7 illustrates another example portable metering device that may be used to implement the example portable metering device of FIG. 1.

FIG. 7 illustrates another example portable metering device 700 that may be used to implement the example portable metering device 104 of FIG. 1. In the illustrated example of FIG. 7, the example portable metering device 700 is implemented as a key fob that is attachable to a key ring 701 (e.g., with a set of keys 702) and is implemented using a form factor that facilitates carrying the portable metering device 700 by the audience member 102 (FIG. 1). In the illustrated example, the device 700 includes a memory to store media exposure information (media station identifiers and associated timestamps) and an audience member personal identifier. As described above, the memory of the device 700 is also configured to store a listing of media station identifiers indicative of media stations to which the audience member 102 can be exposed or is likely to be exposed. To display the media station identifiers, the device 700 is provided with a display 704, which is implemented using, for example, a liquid crystal display (LCD). To navigate or scroll through the media station identifiers stored in the memory of the device 700, the device 700 is provided with a navigation interface 706. In the illustrated example, the device 700 is configured to advance whole pages at a time on the display 704 in forward or reverse fashion in response to actuation of the navigation interface 706. In other examples, the device 700 is configured to advance through display screens with finer granularity than that offered by advancing whole pages at a time. The navigation interface 706 may be implemented using a scroll wheel, up and down buttons, a rocker switch, a capacitive switch, or any other type of mechanical user interface.

Depending on whether the device 600, 700 is to be shared among audience members, the device 600, 700 can be configured to store one or more audience member identifiers. In a dedicated device implementation, only one audience member identifier needs to be stored and that identifier need not be stored multiple times. In a shared device implementation, the audience member identifiers are stored in association with the station identifiers and timestamps.

To enable the audience member 102 to indicate when exposure to a media station has begun, the device 700 is provided with an 'IN' button 708. To enable the audience member 102 to indicate when exposure to a media station has ended, the device 700 is provided with an 'OUT' button 710. When exposure to a media station has started, the audience member 102 uses the navigation interface 706 to display and specify or select the station identifier indicative of the tuned media station and depresses the 'IN' button 708 to indicate that exposure to the specified media station has started. In turn, the device 700 stores the selected station identifier in association with a timestamp and a start of exposure identifier (e.g., a bit, a string, etc.). When the audience member 102 ceases to be exposed to the previously identified media station, the audience member 102 depresses the 'OUT' button 710. In turn, the device 700 stores the station identifier in association with a timestamp and an end of exposure identifier (e.g., a bit, a string, etc.).

In some implementations, when the television 106 or the radio 108 is changed to a different station, the audience member 102 uses the navigation interface 706 to display and specify or select the station identifier indicative of the newly tuned media station and depresses the 'IN' button 708 to indicate that exposure to the newly specified media station has started. In turn, the device 700 stores the newly selected station identifier in association with a timestamp and a start of exposure identifier. In such a situation, the timestamp also indicates the time at which the exposure to the previously tuned station ceased. Thus, the newly generated timestamp is also stored in association with the station identifier representative of the previously tuned station to indicate an end of a media exposure session.

To transfer the media exposure information (e.g., station identifier(s) and timestamp(s)) and the audience member personal identifier(s) stored in the memory of the device 700 to the computer 114 of FIG. 1, the device 700 is provided with a data interface 712 (e.g., the communication device 1128 of FIG. 11), which may be implemented using any type of wired data interface (e.g. Universal Serial Bus (USB), RS-232, etc.). To initiate a data transfer process, the audience member 102 can use the navigation interface 706 to display a data transfer screen on the output display 704 and can select a transfer selection in the navigation interface 706 or one of the buttons 708 and 710. In other example implementations, the device 700 is provided with a wireless data transfer interface (e.g., a Bluetooth® interface, an IEEE 802.11 interface, etc.).

Figure 8:
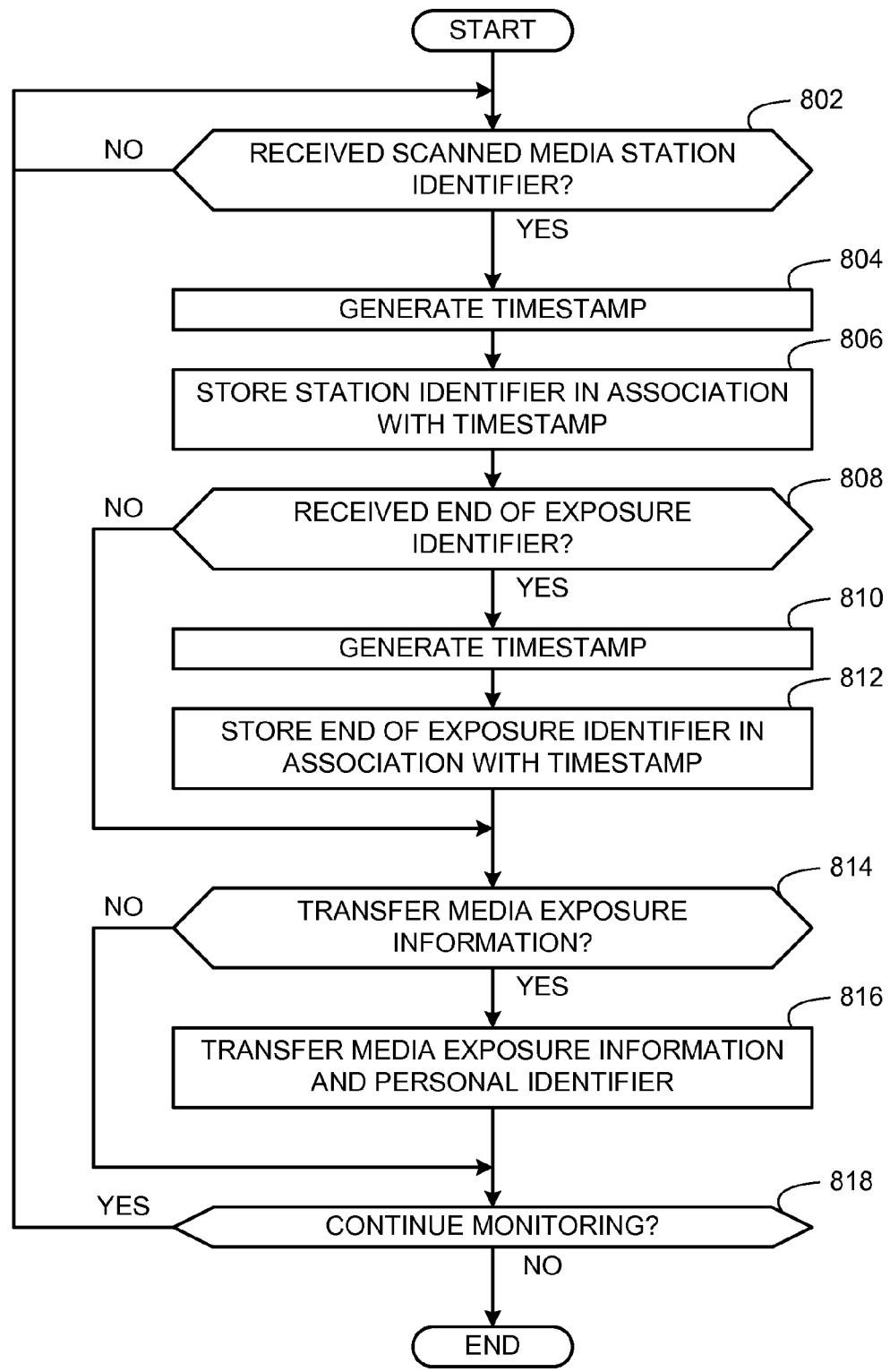
FIG. 8 is a flow diagram representative of example machine accessible instructions that may be executed to implement the example portable metering device of FIG. 6.
Figure 9:
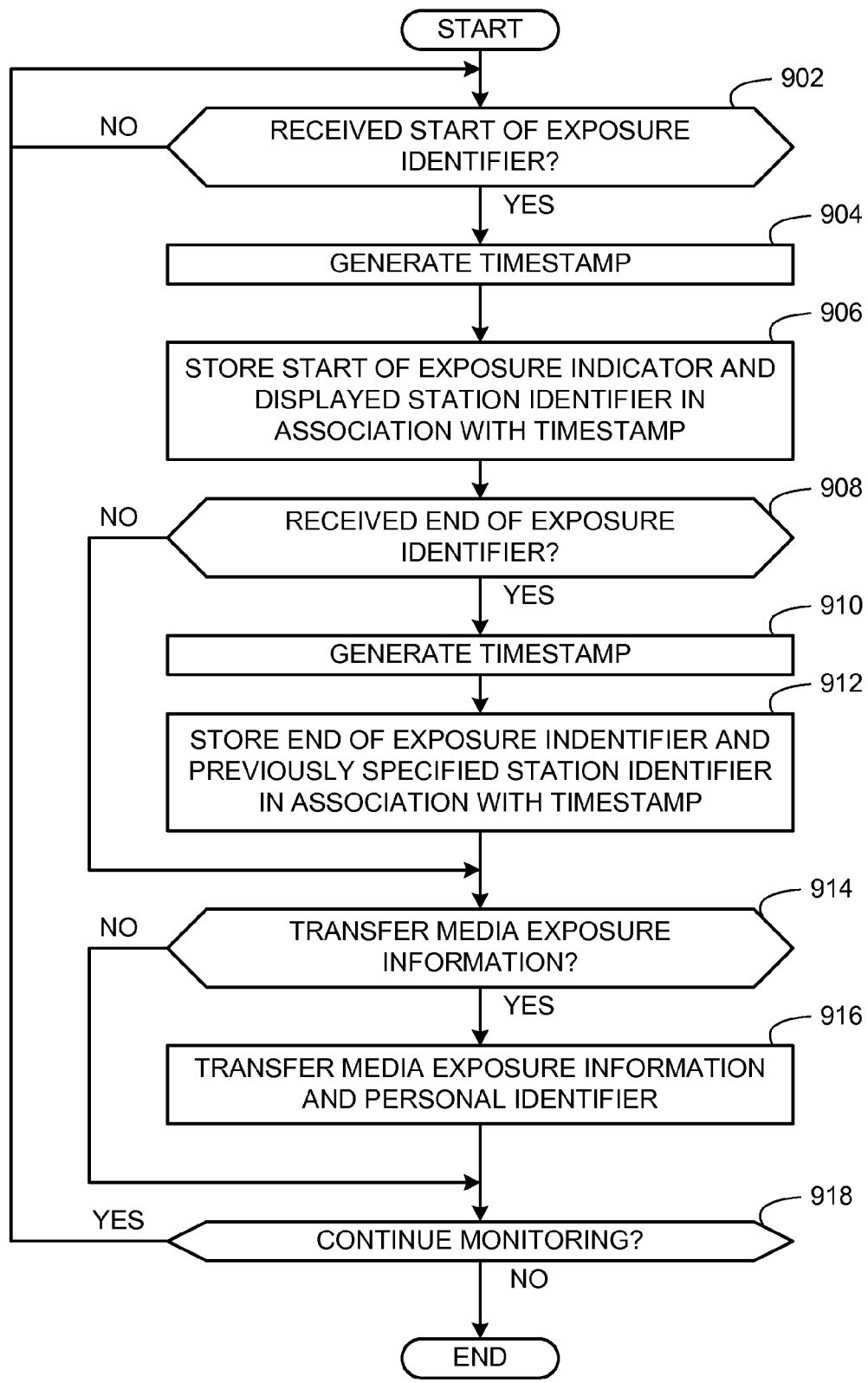
FIG. 9 is a flow diagram representative of example machine accessible instructions that may be executed to implement the example portable metering device of FIG. 7.
Figure 10:
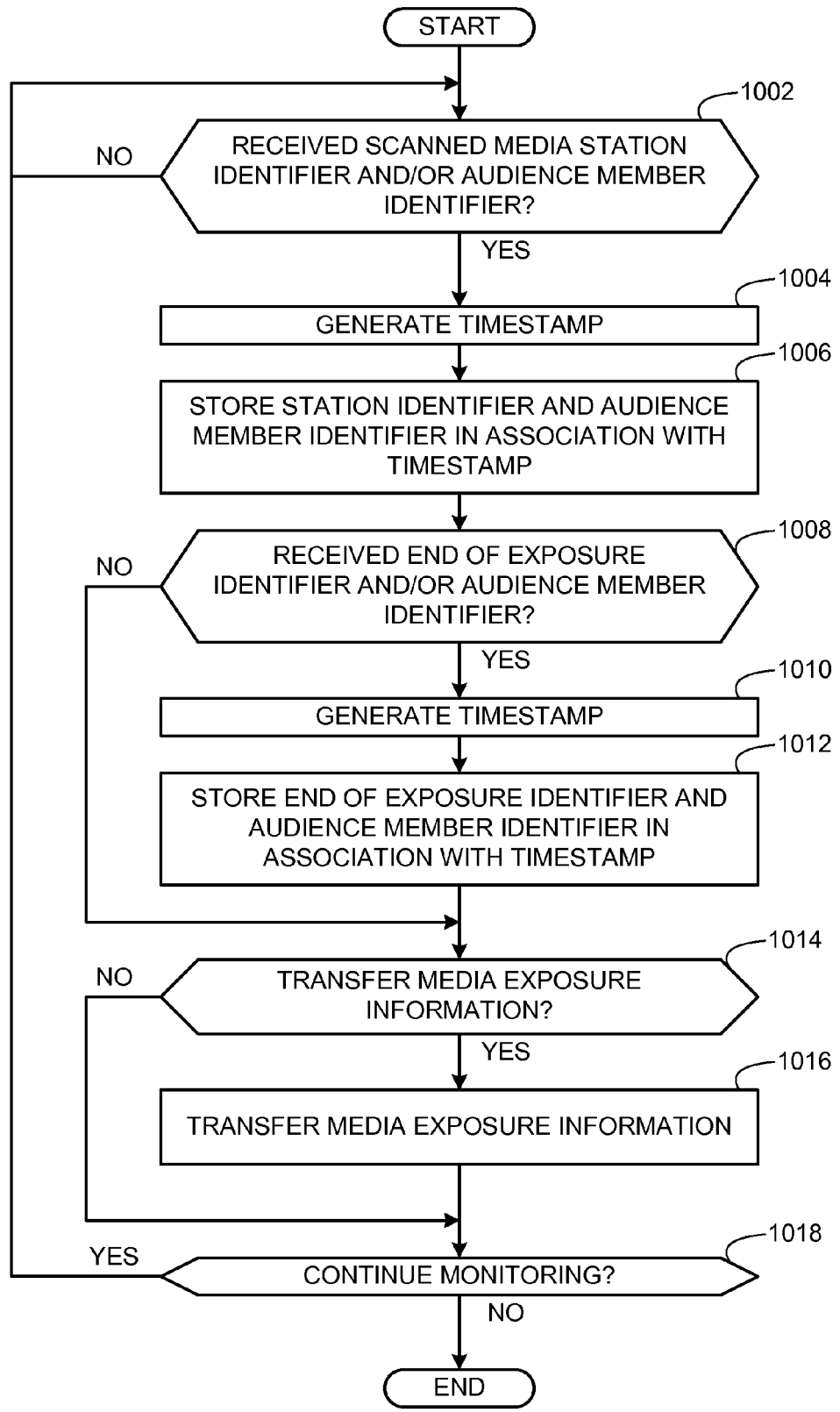
FIG. 10 is a flow diagram representative of example machine accessible instructions that may be executed to implement the example stationary metering devices of FIG. 2.

FIGS. 8-10 are flow diagrams representative of example machine readable instructions that may be executed (e.g., by the example processor system 1110 of FIG. 11) to implement the example metering device 104 of FIG. 1, the example metering devices 202a-b of FIG. 2 and/or components thereof. The example machine readable instructions of FIGS. 8-10 may be executed by a processor, a controller, and/or any other suitable processing device. For example, the example machine readable instructions of FIGS. 8-10 may be embodied in coded instructions stored on a tangible medium such as a flash memory, or random access memory (RAM) associated with a processor (e.g., the processor 1112 of FIG. 11). Alternatively, some or all of the example flow diagrams of FIGS. 8-10 may be implemented using an application specific integrated circuit (ASIC), a programmable logic device (PLD), a field programmable logic device (FPLD), discrete logic, hardware, firmware, etc. In addition, some or all of the example flow diagrams of FIGS. 8-10 may be implemented manually or as a combination of any of the foregoing techniques (e.g., any combination of firmware, software, hardware, and/or discrete logic). Although the machine readable instructions of FIGS. 8-10 are described with reference to the example flow diagrams of FIGS. 8-10, other methods of implementing the metering devices 104, 202a, and/or 202b and/or, more generally, the media consumption environment 100 of FIG. 1 may be employed. For example, the order of execution of the blocks may be changed, and/or some of the blocks described may be changed, eliminated, sub-divided, and/or combined. Additionally, the example machine readable instructions of FIGS. 8-10 may be carried out sequentially and/or carried out in parallel by, for example, separate processing threads, processors, devices, circuits, etc.

FIG. 8 is a flow diagram representative of example machine accessible instructions that may be executed to implement the example portable metering device 600 of FIG. 6. For example, the example device 600 may include a processor (e.g., the processor 1112 of FIG. 11) communicatively coupled to peripheral devices (e.g., the barcode scanner 604, the scan button 606, the data interface 608, and the data transfer button 610 of FIG. 6) and a memory. The processor is configured to execute instructions represented by the operations of the flow diagram of FIG. 8 to store media exposure information and communicate the media exposure information to the computer 114 of FIG. 1.

Initially, the device 600 determines whether it has received a scanned media station identifier (block 802) via the barcode scanner 604. If the device 600 has not received a station identifier, it continues to monitor for a received station identifier at block 802. When the device 600 receives a media station identifier (block 802) representative of a media station to which the audience member 102 is exposed, the device 600 generates a timestamp (block 804) (e.g., using a timing device, such as a real-time clock (RTC)) indicative of the time at which the audience member 102 scanned the station identifier. The device 600 then stores the station identifier in association with the timestamp (block 806) by, for example, creating a media exposure data record and storing the station identifier and the timestamp therein.

The device 600 then determines whether it has received an end of exposure identifier (block 808) via the barcode scanner 604. For example, the device 600 may receive an end of exposure identifier when the audience member 102 scans the 'END' barcode 302 shown in FIG. 3. If the device 600 received the end of exposure identifier associated with the 'END' barcode 302 (block 808), the device 600 generates a timestamp (block 810) and stores the end of exposure identifier in association with the timestamp (block 812). For example, the device 600 may store the end of exposure identifier and the associated timestamp in the same data record created for storing the station identifier and its timestamp at block 806. For instances in which the audience member 102 does not scan the end of exposure identifier from the 'END' barcode 302 but instead scans in a station identifier to which a media presentation device is subsequently tuned, the timestamp for the subsequently scanned station identifier can be used as the end of exposure time for the previously scanned station identifier.

The device 600 then determines whether it should transfer the media exposure information stored in its memory (block 814) to, for example, the computer 114. In the illustrated example, the device 600 is configured to transfer the media exposure information and a personal identifier of the audience member 102 associated with the device 600 when the audience member depresses the data transfer button 610. Additionally or alternatively, the device 600 may be configured to transfer the media exposure information in response to a request from the central data collection facility 116 or according to a schedule. If the device 600 determines that it should transfer the media exposure information stored in its memory (block 814), the device 600 transfers the media exposure information and the audience member personal identifier to the computer 114 (block 816) via the data interface 608.

The device 600 then determines whether it should continue to monitor for scanned media station identifiers (block 818). If the device 600 is to continue monitoring for scanned station identifiers (block 818), control returns to block 802. Otherwise the example process of FIG. 8 is ended.

FIG. 9 is a flow diagram representative of example machine accessible instructions that may be executed to implement the example portable metering device 700 of FIG. 7. For example, the example device 700 may include a processor (e.g., the processor 1112 of FIG. 11) communicatively coupled to peripheral devices (e.g., the display 704, the navigation interface 706, the 'IN' button 708, the 'OUT' button 710, and/or the data interface 712 of FIG. 7) and a memory. The processor is configured to execute instructions represented by the operations of the flow diagram of FIG. 9 to store media exposure information and communicate the media exposure information to, for example, the computer 114 of FIG. 1.

Initially, the device 700 determines whether it has received a start of exposure identifier (block 902). For example, the device 700 may receive a start of exposure identifier when the audience member 102 uses the navigation interface 706 to display a media station identifier (e.g., using a scroll wheel to search through a list of media station identifiers and stopping when the display 704 shows the media station to which the audience member 102 is being exposed) and depresses the 'IN' button 708. If the device 700 has not received a start of exposure identifier, it continues to monitor for a received start of exposure identifier at block 902. When the device 700 receives a start of exposure identifier (block 902), the device 700 generates a timestamp (block 904) (e.g., using a timing device, such as a real-time clock (RTC)) indicative of the time at which the audience member 102 depressed the 'IN' button 708. The device 700 then stores the start of exposure identifier and a media station displayed on the display 704 in associated with the timestamp (block 906) by, for example, creating a media exposure data record and storing the start of exposure identifier, the station identifier, and the timestamp therein.

The device 700 then determines whether it has received an end of exposure identifier (block 908). For example, the device 700 may receive an end of exposure identifier when the audience member 102 depresses the 'OUT' button 710. If the device 700 received the end of exposure identifier (block 908), the device 700 generates a timestamp (block 910) and stores the end of exposure identifier and the previously specified media station identifier in association with the timestamp (block 912). For example, the device 700 may store the end of exposure identifier and the associated timestamp in the same data record created for storing the start of exposure identifier, the station identifier and the start of exposure timestamp at block 906. For instances in which the audience member 102 does not depress the 'OUT' button 710 to indicate when exposure to a media station has ceased but instead depresses the 'IN' button 708 to select a media station for which a media presentation device is subsequently tuned, the timestamp for the subsequently scanned station identifier can be used as the end of exposure time for the previously scanned station identifier.

The device 700 then determines whether it should transfer the media exposure information stored in its memory (block 914) to, for example, the computer 114. For example, the device 700 may be configured to transfer the media exposure information and a personal identifier of the audience member 102 associated with the device 700 when the audience member depresses the navigation interface 706 (or one of the buttons 708 and 710) while the display 704 is showing a data transfer screen. If the device 700 determines that it should transfer the media exposure information stored in its memory (block 914), the device 700 transfers the media exposure information and the audience member personal identifier to the computer 114 (block 916) via the data interface 712.

The device 700 then determines whether it should continue to monitor for start of exposure and/or end of exposure identifiers (block 918). If the device 700 is to continue monitoring for start and end of exposure identifiers (block 918), control returns to block 902. Otherwise the example process of FIG. 9 is ended.

FIG. 10 is a flow diagram representative of example machine accessible instructions that may be executed to implement the example stationary metering devices 202*a-b* of FIG. 2. For example, the example devices 202*a-b* may include a processor (e.g., the processor 1112 of FIG. 11) communicatively coupled to peripheral devices (e.g., a barcode scanner, a scan button, a data interface, a data transfer button, etc.) and a memory. The processor is configured to execute instructions represented by the operations of the flow diagram of FIG. 10 to store media exposure information and communicate the media exposure information to, for example, the computer 114 of FIG. 1. For purposes of discussion, the flow diagram of FIG. 10 is described in connection with the example stationary metering device 202*a* associated with the television 106 to collect media exposure information associated with exposure to programming from different television stations. However, the example instructions represented by the flow diagram of FIG. 10 may be adapted to be implement the stationary metering device 202*b* associated with the radio 108.

Initially, the device 202*a* determines whether it has received a scanned television station identifier and/or an audience member personal identifier (block 1002) via a barcode scanner. If the device 202*a* has not received either a station identifier or an audience member identifier, it continues to monitor for the identifiers at block 1002. When the device 202*a* receives a scanned television station identifier representative of a television station to which the audience member 102 is exposed or an audience member identifier representative of the identity of the audience member 102 (block 1002), the device 202*a* generates a timestamp (block 1004) (e.g., using a timing device, such as a real-time clock (RTC)) indicative of the time at which the audience member 102 scanned in the station identifier or the audience member identifier. In some example situations, receiving the scanned station identifier or the audience member identifier indicates the beginning of an exposure session for an individual, such as a household member turning on a television and/or radio and tuning to a media station. In other example situations, receiving the scanned station identifier or the audience member identifier indicates the audience member 102 is joining an audience at the monitored site including one or more audience members who are already being exposed to the media station (e.g., a household member joining the rest of the family in the media consumption environment 100). The device 202*a* then stores the station identifier and/or the audience member identifier in association with the timestamp (block 1006) by, for example, creating a media exposure data record and storing the station identifier and/or the audience member identifier together with the timestamp therein.

The device 202*a* then determines whether it has received an end of exposure identifier and/or an audience member identifier (block 1008) via the barcode scanner. For example, the device 202*a* may receive an end of exposure identifier and the audience member identifier when the audience member 102 scans an end barcode 402 shown in FIG. 4 and the personal identifier barcode card 208 of FIG. 2 to indicate that the audience member 102 is no longer exposed to the identified television station (e.g., when the audience member 102 leaves the media consumption environment 100, when the audience member 102 stops tuning to the currently tuned media station, when the audience member 102 turns off the television and/or radio, etc.). In some implementations, upon receiving an end of exposure identifier, the device 202*a* prompts the audience member 102 to also scan the personal identifier barcode card 208. For example, when more than one audience member has scanned an identifier during an exposure session, the device 202*a* beeps until an identifier is scanned.

If the device 202*a* received the end of exposure identifier and the audience member identifier (block 1008), the device 202*a* generates a timestamp (block 1010) and stores the end of exposure identifier and the audience member identifier in association with the timestamp (block 1012). For example, the device 202*a* may store the end of exposure identifier, the audience member identifier, and the associated timestamp in the same data record created for storing the station identifier, the audience member identifier, and their associated timestamp at block 1006. For instances in which the audience member 102 does not scan in the end of exposure identifier from the end barcode 402 but instead scans in a station identifier to which the television 106 is subsequently tuned, the timestamp for the subsequently scanned station identifier can be used as the end of exposure time for the previously scanned station identifier.

The device 202*a* then determines whether it should transfer the media exposure information stored in its memory (block 1014) to, for example, the computer 114. For example, the device 202*a* may be configured to transfer the media exposure information including the personal identifiers of the audience member(s) associated with such exposure information when, for example, the audience member 102 depresses a data transfer button. If the device 202*a* determines that it should transfer the media exposure information stored in its memory (block 1014), the device 202*a* transfers the media exposure information and the audience member personal identifier(s) to the computer 114 (block 1016) via a wired or wireless data interface.

The device 202*a* then determines whether it should continue to monitor for scanned television station identifiers (block 1018). If the device 202*a* is to continue monitoring for scanned station identifiers (block 1018), control returns to block 1002. Otherwise the example process of FIG. 10 is ended.

Figure 11:
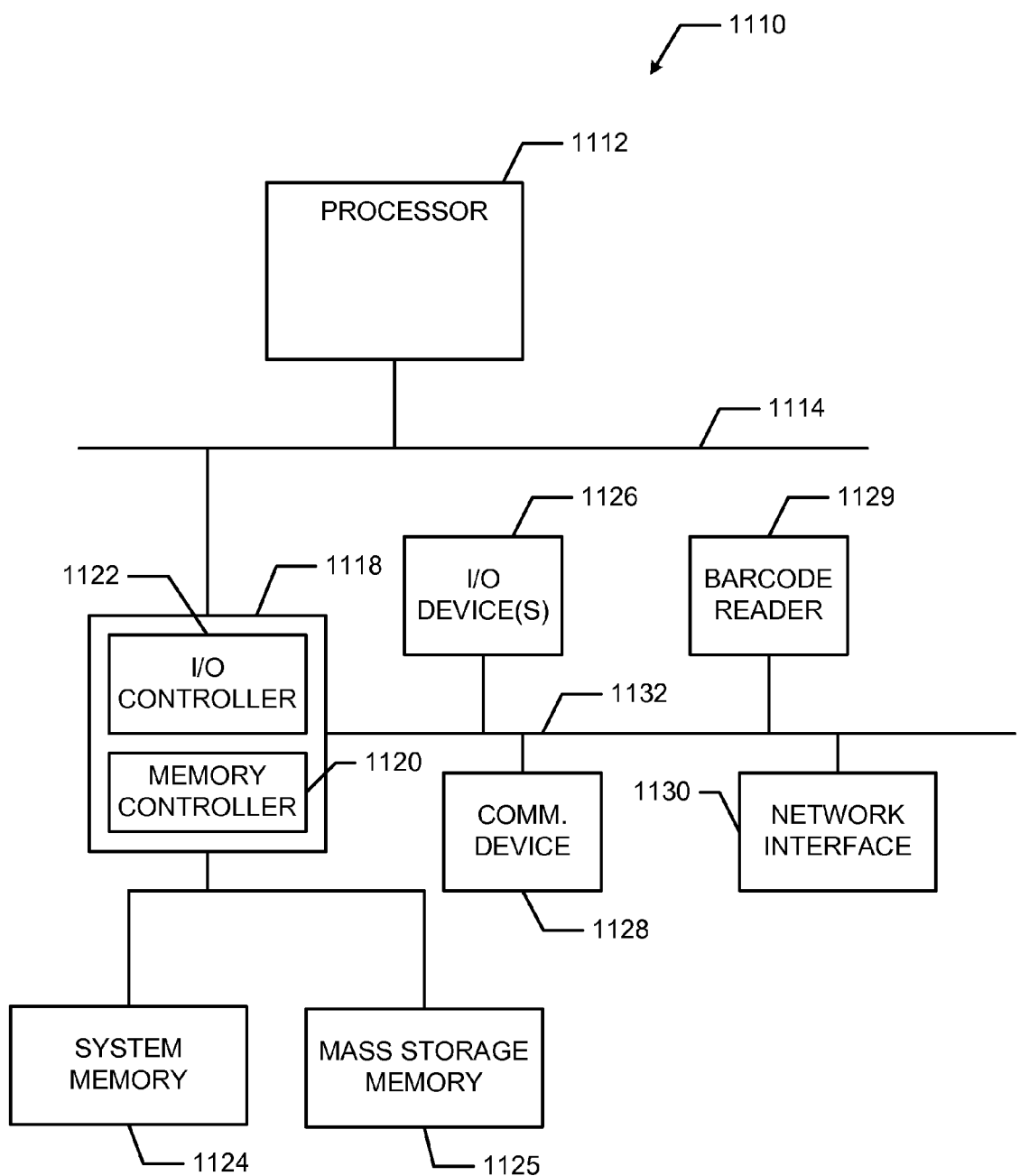
FIG. 11 is a block diagram of an example processor system that may be used to execute the example machine readable instructions of FIGS. 8, 9, and/or 10 to implement the example metering devices of FIGS. 1, 2, 6, and/or 7.

FIG. 11 is a block diagram of an example processor system that may be used to implement any or all of the example devices 202*a*, 202*b*, 600, 700 described herein. As shown in FIG. 11, the processor system 1110 includes a processor 1112 that is coupled to an interconnection bus 1114. The processor 1112 may be any suitable processor, processing unit or microprocessor. Although not shown in FIG. 11, the system 1110 may be a multi-processor system and, thus, may include one or more additional processors that are identical or similar to the processor 1112 and that are communicatively coupled to the interconnection bus 1114.

The processor 1112 of FIG. 11 is coupled to a chipset 1118, which includes a memory controller 1120 and an input/output (I/O) controller 1122. The chipset provides I/O and memory management functions as well as a plurality of general purpose and/or special purpose registers, timers, etc. that are accessible or used by the processor 1112 coupled to the chipset 1118. The memory controller 1120 performs functions that enable the processor 1112 (or processors if there are multiple processors) to access a system memory 1124 and a mass storage memory 1125.

The system memory 1124 may include any desired type of volatile and/or non-volatile memory such as, for example, static random access memory (SRAM), dynamic random access memory (DRAM), flash memory, read-only memory (ROM), etc. The mass storage memory 1125 may include any desired type of mass storage device including hard disk drives, optical drives, tape storage devices, etc. The example machine readable instructions of FIGS. 8, 9, and/or 10 may be stored in the system memory 1124.

The I/O controller 1122 performs functions that enable the processor 1112 to communicate with peripheral input/output (I/O) device(s) 1126, a communication device 1128, a barcode reader 1129, and a network interface 1130 via an I/O bus 1132. The I/O device(s) 1126 may be any desired type of I/O device such as, for example, a keyboard, a video display or monitor, a mouse, etc. The communication device 1128 may be any desired type of wired communication device such as, for example, Universal Serial Bus (USB), RS-232, etc., or any type of desired wireless communication device such as, for example, a Bluetooth® interface, a Zigbee® interface, an IEEE 802.11 interface, etc. The barcode reader 1129 may be any desired type of signal processing device capable of receiving and interpreting a barcode.

The network interface 1130 may be, for example, an Ethernet device, an asynchronous transfer mode (ATM) device, an 802.11 device, a DSL modem, a cable modem, a cellular modem, etc. that enables the processor system 1110 to communicate with another processor system.

While the memory controller 1120 and the I/O controller 1122 are depicted in FIG. 11 as separate functional blocks within the chipset 1118, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A metering device to collect media exposure information, the metering device comprising:
   a housing;
   an input carried by the housing;
   a display carried by the housing to present a list of media stations which may be tuned by a media device different than the metering device, the metering device incapable of tuning to the media stations;
   a processor carried by the housing to identify which of the media stations is displayed when the input is selected; and
   memory carried by the housing to store an indication of an exposure to the identified media station via the media device, the indication including the identified media station and a timestamp corresponding the selection of the input.

2. A metering device as defined in claim 1, wherein the memory includes an identifier associated with a person.

3. A metering device as defined in claim 2, wherein the list of media stations includes media stations to which the person is likely to be exposed based on a location.

4. A metering device as defined in claim 3, wherein the location includes a geographic area including a residence of the person.

5. A metering device as defined in claim 3, wherein the location includes a geographic area including a destination to which the person is expected to travel.

6. A metering device as defined in claim 1, further including a communication device carried by the housing to communicate the indication.

7. A metering device as defined in claim 1, further including a scroll wheel to facility display of the list of media stations.

8. A metering device as defined in claim 1, wherein the housing includes a key fob.

9. A metering device as defined in claim 1, further including a barcode scanner.

10. A metering device as defined in claim 1, wherein engagement of the input is to indicate a start of an exposure to one of the media stations, and further including a second input carried by the housing, engagement of the second input to indicate an end of an exposure to the one of the media stations.

11. A method, comprising:
    displaying a list of media stations on a portable metering device, the portable metering device being incapable of tuning the media stations;
    identifying a first one of the media stations as being displayed at a first time corresponding to a selection of an input of the portable metering device;
    generating a timestamp corresponding to the first time; and
    storing an indication of an exposure to the first one of the media stations, the indication including the first media station and the timestamp.

12. A method as defined in claim 11, further including associating a user identifier stored on the portable metering device with the indication.

13. A method as defined in claim 12, further including communicating the indication and the user identifier to a collection facility.

14. A method as defined in claim 11, further including:
    detecting a second selection of a second input at a second time; and
    generating a second timestamp corresponding to the second time.

15. A method as defined in claim 14, further including storing a second indication of an end of the exposure to the first media station, the second indication including the second timestamp.

16. A machine readable storage device comprising instructions that, when executed, cause a machine to at least:
    display a list of media stations on a portable metering device, the portable metering device being incapable of tuning the media stations;
    identify a first one of the media stations as being displayed at a first time corresponding to a selection of an input of the portable metering device;
    generate a timestamp corresponding to the first time; and
    store an indication of an exposure to the first one of the media stations, the indication including the first media station and the timestamp.

17. A storage device as defined in claim 16, wherein the instructions, when executed, cause the machine to associate a user identifier stored on the portable metering device with the indication.

18. A storage device as defined in claim 17, wherein the instructions, when executed, cause the machine to communicate the indication and the user identifier to a collection facility.

19. A storage device as defined in claim 16, wherein the instructions, when executed, cause the machine to:
   detect a second selection of a second input at a second time; and
   generate a second timestamp corresponding to the second time.

20. A storage device as defined in claim 19, wherein the instructions, when executed, cause the machine to store a second indication of an end of the exposure to the first media station, the second indication including the second timestamp.

21. A storage device as defined in claim 16, wherein the media stations include at least one of television stations, Internet stations or radio stations.

\* \* \* \* \*